(12) United States Patent
Jamadagni et al.

(10) Patent No.: US 10,299,121 B2
(45) Date of Patent: May 21, 2019

(54) SYSTEM AND METHOD FOR PROVIDING DIFFERENTIAL SERVICE SCHEME

(71) Applicant: Reliance Jio Infocomm Limited, Mumbai (IN)

(72) Inventors: Satish Nanjunda Swamy Jamadagni, Bengaluru (IN); Sarvesha Anegundi Ganapathi, Bengaluru (IN); Pradeep Krishnamurthy Hirisave, Bengaluru (IN)

(73) Assignee: RELIANCE JIO INFOCOMM LIMITED, Mumbai (IN)

( * ) Notice: Subject to any disclaimer, the term of this patent is extended or adjusted under 35 U.S.C. 154(b) by 65 days.

(21) Appl. No.: 15/308,815

(22) PCT Filed: Jun. 23, 2015

(86) PCT No.: PCT/IN2015/000258
§ 371 (c)(1),
(2) Date: Nov. 3, 2016

(87) PCT Pub. No.: WO2016/056020
PCT Pub. Date: Apr. 14, 2016

(65) Prior Publication Data
US 2017/0195880 A1     Jul. 6, 2017

(30) Foreign Application Priority Data
Jun. 24, 2014   (IN) .......................... 2037/MUM/2014

(51) Int. Cl.
*H04W 12/06* (2009.01)
*H04L 12/28* (2006.01)
*H04W 8/18* (2009.01)

(52) U.S. Cl.
CPC ......... *H04W 12/06* (2013.01); *H04L 12/2801* (2013.01); *H04W 8/18* (2013.01)

(58) Field of Classification Search
None
See application file for complete search history.

(56) References Cited

U.S. PATENT DOCUMENTS

2005/0177515 A1* 8/2005 Kalavade ............ H04L 63/0892
                                                    705/52
2011/0076991 A1   3/2011 Mueck
(Continued)

OTHER PUBLICATIONS

International Search Report for PCT/IN2015/000258 dated Jan. 27, 2016.
(Continued)

*Primary Examiner* — Hicham B Foud
(74) *Attorney, Agent, or Firm* — Ladas & Parry, LLP

(57) ABSTRACT

The present invention discloses a system and method for providing differential service scheme. The present invention provides differential service to one or more secondary device based on exchange of identification information of every secondary device. Further, the present invention discloses mechanism for establishing connection with a primary device, the secondary device and service provider network by authenticating and binding the secondary device. Furthermore, the present invention discloses mechanism for accounting the secondary devices for availing the differential service based on identification information of the secondary device.

10 Claims, 3 Drawing Sheets

(56) References Cited

U.S. PATENT DOCUMENTS

| | | | |
|---|---|---|---|
| 2012/0317261 A1* | 12/2012 | Ahmavaara | H04L 63/0815 |
| | | | 709/223 |
| 2013/0176908 A1 | 7/2013 | Baniel et al. | |
| 2014/0173111 A1 | 6/2014 | Varner | |
| 2015/0365403 A1* | 12/2015 | Counterman | H04L 63/0876 |
| | | | 726/9 |
| 2015/0373530 A1* | 12/2015 | Stein | H04L 63/0853 |
| | | | 455/411 |
| 2017/0149570 A1* | 5/2017 | Counterman | H04L 9/3247 |

OTHER PUBLICATIONS

Written Opinion of the International Search Authority PCT/IN2015/000258 dated Jan. 27, 2016.

L. Barriga, B. Smeets, and K Sallberg, "M2M remote subscription management using M2M communications identity module", Ericsson Review (Jan. 2011) Figure 3.

* cited by examiner

SYSTEM AND METHOD FOR PROVIDING DIFFERENTIAL SERVICE SCHEME

CROSS-REFERENCE TO RELATED APPLICATIONS

This application is the U.S. national phase of PCT Application PCT/IN2015/000258 filed on Jun 23, 2015, which claims the priority of the Indian patent application No. 2037/MUM/2014 filed on Jun 24, 2014, which are incorporated herein by reference in their entireties.

FIELD OF THE INVENTION

The present invention generally relates to communication systems. More particularly, the invention relates to system for providing differential service based on identity details of router device and end-devices.

BACKGROUND OF THE INVENTION

In this age of modernization, the scope and applicability of communication system is vast and growing day by day. The huge growth of communication systems and standards enabled service coverage across the globe. However, due to some limitations and difficulty to provide service to every individual necessitated the development of portable mobile routers also called as MiFi devices.

MiFi devices allow multiple end users and mobile devices to share a 2G, 3G or 4G mobile broadband internet connections and create an ad-hoc network like a WiFi hotspot. The MiFi can function with a distance up to ten meters and deliver Internet or network access to any Wi-Fi-enabled end user devices.

As more than one user can connect to the MiFi device, the business model of accounting a MiFi device with the right credentials becomes complicated and there exist no solution. The key problems are to enable voice calling through appropriate credential exchange between the different entities like the calling device (end user device), connectivity router (MiFi device) and the LTE network (service provider). Further, in scenario where the connectivity routers like the Mifi devices and the end user devices connected over such connectivity routers have valid credentials it becomes critical to specify which of these credentials are used for obtaining connectivity services. In contrast there are scenarios when the connecting device (end user device) will have no credentials of its own but will have to use the credentials of the MiFi device to access the services.

Further, the existing art does not address the issue of dynamic on the fly attachment procedures. The on the fly subscription mechanisms is an important part of enabling voice calling through a connectivity device for any new connecting devices having a short term valid subscription but no router connectivity.

Accordingly, there lies need in the art to provide binding mechanism and system that allows full subscription, identification/authorization and billing functionality by dynamically using the device identity (credential) of either of the end user device(s), MiFi device or both.

SUMMARY OF THE INVENTION

The present invention discloses mechanism for providing differential services based on appropriate identification exchange between the devices for availing differential service and the service provider.

In one aspect, the present invention discloses a system for providing differential service scheme. The system comprises:

A primary device for facilitating at least one service to at least one secondary device; wherein the service is provided based on information characteristic of at least one of the primary and secondary device; said information characteristic comprises at least one of a credential information and a subscription information of one of the primary or secondary device; and said information characteristic is at least a pre-configured and real-time generated information;

A device server for maintaining said at least one of the credential information and subscription information; an operator server for monitoring the credential information of the at least one authenticated secondary device and providing differential dissemination of at least one service via the primary device; and Wherein at least one of the device server and the operator server authenticates the at least one secondary device based on a notification by the primary device; and the operator server binds the at least one secondary device based on said authentication for providing differential dissemination of at least one service via the primary device.

An account manager for maintaining record of differential service being availed by the at least one secondary device based on said information characteristic of the at least one the authenticated secondary device.

Further, in another aspect of the invention. The present invention discloses a method for providing differential service scheme. The method comprising steps of:

Facilitating at least one service to at least one secondary device by a primary device; wherein the service is provided based on information characteristic of at one of the primary and secondary device; said information characteristic comprises at least one of a credential information and a subscription information of one of the primary or secondary device; and said information characteristic is at least a pre-configured and real-time generated information;

Maintaining said at least one of the credential information and subscription information by a device server; monitoring the credential information of the at least one authenticated secondary device and providing differential dissemination of at least one service via the primary device by an operator server.

Wherein at least one of the device server and the operator server authenticates the at least one secondary device based on a notification by the primary device; and the operator server binds the at least one secondary device based on said authentication for providing differential dissemination of at least one service via the primary device.

An account manager for maintaining record of differential service being availed by the at least one secondary device based on said information characteristic of the at least one the authenticated secondary device by an account manager.

Figure 1:
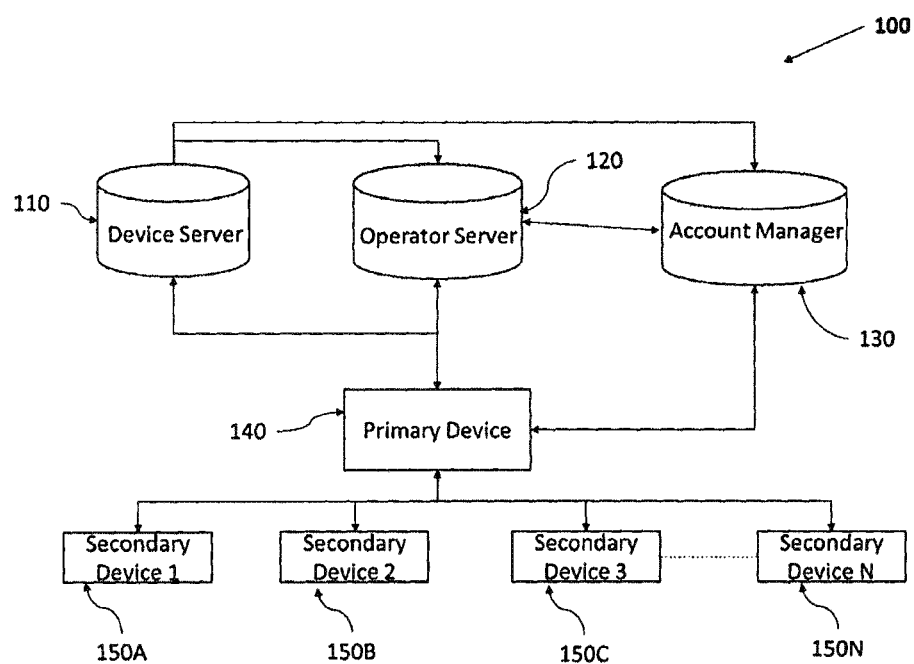
FIG. 1 illustrates a simplified block diagram of the system of differential service scheme.

The foregoing will be apparent from the following more particular description of example embodiments of the invention, as illustrated in the accompanying drawings.

DETAILED DESCRIPTION OF THE INVENTION

In the following description, for the purposes of explanation, various specific details are set forth in order to provide a thorough understanding of the present invention. It will be apparent, however, that the present invention may be practiced without these specific details. Several features described hereafter can each be used independently of one another or with any combination of other features. However, any individual feature may not address any of the problems discussed above or might address only one of the problems discussed above. Some of the problems discussed above might not be fully addressed by any of the features described herein. Although headings are provided, information related to a particular heading, but not found in the section having that heading, may also be found elsewhere in the specification. Example embodiments of the present invention are described below, as illustrated in various drawings in which like reference numerals refer to the same parts throughout the different drawings.

The present invention discloses a system and method of binding end-device users (herein after referred to as secondary device) with connectivity routers such as MiFi routers (herein after referred to as primary device) and service provider network. The service provider network consists of multiple servers wherein the additional server and authentication system can be third party servers and authentication system.

The present invention discloses flexible mechanism of binding secondary device(s) with the primary device and/or service provider network for providing differential service scheme using the identity details (herein after referred to as credentials) of the primary device and/or secondary device(s). As used herein, the secondary device is the PDA's (personal digital assistant) such as mobile phone, tablet, portable computer, laptop, desktop, etc. wherein the primary device 140 is routing device such as MiFi device.

Further, the differential service can be provided to single user or group of user based on credential of the at least one secondary device, the primary device 140 and/or combination thereof. The subscription for a differential service is one of data, voice call, video call and combination thereof. In a scenario, the user of a secondary device subscribes to any one type of services out of data, voice call and video call, the user will be allowed to use only the service that user has subscribed. In another scenario, the user can opt for any one or combination of the services in the subscription. Accordingly, the user will be allowed to avail the services included in the subscription.

As disclosed in the present invention, the data service is one of the SMS (short message service), Internet (2G/3G/LTE/4G), flash message services, future development of the Internet Standards/Protocols and combination thereof. The voice call service is VoI (Voice over Internet) and/or regular/standard voice call services. Further, the video call disclosed in the present invention involves any video communication encoding/decoding and Video telephony techniques/standards (e.g. MPEG part-2, MPEG part-10, etc.).

In a scenario where the secondary devices do not have credential to obtain service, the present invention encompasses mechanism of binding one or more secondary devices with the primary device and/or the service provider network for providing differential by using the credential of the primary device.

In another scenario where all the secondary devices connected to the primary device have valid credentials, the present invention encompasses mechanism of binding the secondary devices with the primary device and/or the service provider network for providing differential by dynamically using any one or more credentials of one of the primary device, the secondary device and combination thereof. In another scenario where a new secondary device asks to avail the differential service, the present mechanism encompasses a real-time subscription for fetching credential of the secondary device for allowing differential service.

The credential used for providing differential service as disclosed in the present invention includes SIM (Subscriber Identity Module) credential and device credential such as but not limited to IIN (Issuer identification number), IMSI (International mobile subscriber identity), IMEI (International Mobile Station Equipment Identity), and MSISDN (Mobile Station Integrated Services Digital Network).

As illustrated in FIG. 1, the system 100 for providing differential service scheme comprises a primary device 140 for facilitating differential service to one or more secondary devices 150 (A, B, C, N); a device server 110 for storing credential information and subscription information of at least one of the primary and secondary device 150; an operator server 120 for monitoring the credential information of the at least one authenticated secondary device 150 and providing differential dissemination of at least one service via the primary device; and an account manager 130 for maintaining record of differential service being availed by the at least one secondary device 150 based on said information characteristic of the at least one the authenticated secondary device 150.

Further, the differential service as disclosed in the present invention is provided based on information characteristic of at one of the primary device 140 and secondary device 150. The information characteristic comprises at least one of the credential information and the subscription information of one of the primary device 140 or secondary device 150. The credential information consist of but not limited to the unique identity numbers associated with a device have SIM (subscriber Identity Module) or without SIM such as IMEI number, IMSI number, MSISDN number etc. as applicable.

The subscription information comprises details of the differential service that is to be provided to the secondary device 150 based on the information characteristic. Further, the subscription information contains the type of differential service such as data service, voice service, video service and combination thereof.

Further, the information characteristic as disclosed in the present invention is at least a pre-configured and real-time generated information wherein the pre-configured information is stored in the device server 110 at the time of registration for availing differential service. During registration, the information characteristics which are credential information and subscription information are saved at the device server 110. The real-time information is the information characteristic which is acquired from a new secondary device 150 at the time of establishing connection for availing differential service.

The present invention encompasses authentication of the secondary device 150 by at least one of the device server 110 and operator server 120 based on a notification by the primary device. The notification updates at least one of the device server 110 and operator server 120 that the primary device 140 being the service facilitator device. Wherein, the notification is sent though one of the access stratum or/and a non-access stratum message.

The present invention further encompasses the notification by the primary device 140 being a one bit indicator used to bind the secondary device 150 for receiving differential service based on subscription of the secondary device 150.

In a preferred scenario, the one bit indicator indicating that the primary device is a connectivity device is sent to one of a device server and operator server during the binding mechanism. This in turn triggers the authentication and the binding procedure for secondary devices behind the primary device.

Based on the authentication by at least one of the device server 110 and operator server, the operator server 120 binds the secondary device 150 for providing differential service wherein binding is the mechanism of establishing connection for up linking and down linking.

Further, the present invention encompasses an information manager for identifying the preconfigured information and generating real-time information. Wherein, the real-time information is generated by providing a subscription link to the secondary device 150 and upon subscribing, the real-time information is generated and stored in the device server 110.

As disclosed in the present invention, the account manager 130 is a PCRF (Policy and Charging Rule Function) unit wherein details log regarding the use of differential service is maintained and mapped against the device availing such differential service. The log is one of time based, data usage based, data rate based and combination thereof but not limited to any other business criteria for accounting.

Moreover, the device server 110 as disclosed in the present invention includes but not limited to HSS (Home Subscriber Server), AAA (Authentication, Authorization and Accounting), and IMS (IP Multimedia Core Network Subsystem). The present invention further encompasses the information received and stored at the device server 110 being forwarded to the operator server 120 for using the necessary information characteristic and service protocols to provide differential service.

The present invention encompasses the primary device 140 being the authenticity validator for binding the secondary device 150 with one of the device server 110 and operator server 120 along with the capability of acting as the account manager 130 for maintain the log of differential service.

Figure 1A:
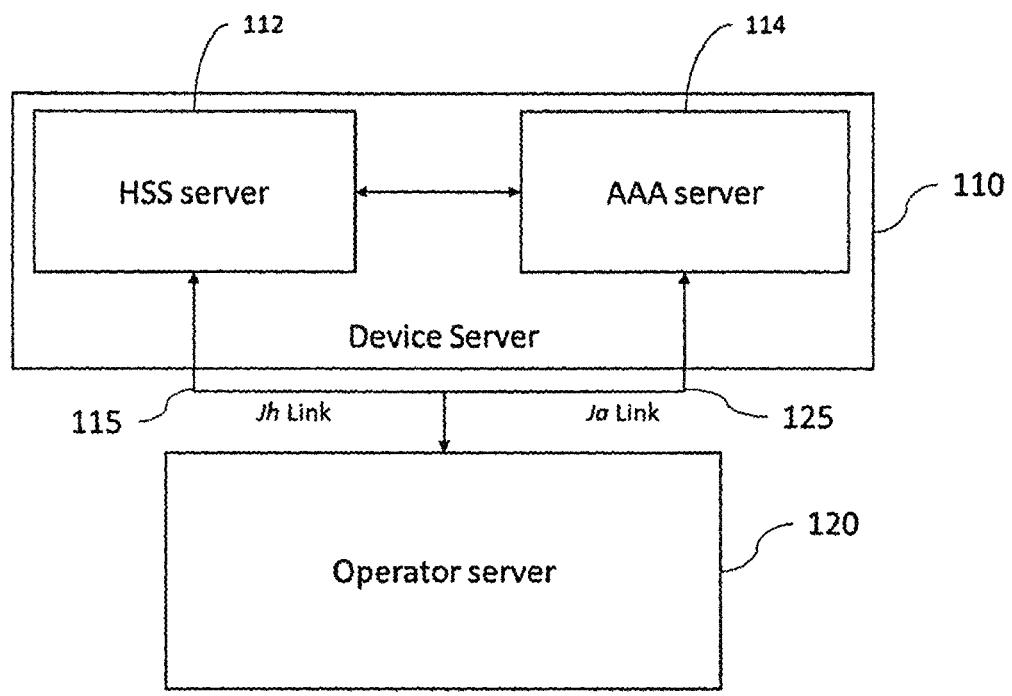
FIG. 1A illustrates the communication between the, components of device server and the operator server.

As illustrated in FIG. 1A, the simplified block diagram represents the communication between the components of the device server 110 and the operator server 120 in a preferred scenario. The device server 110 comprises a HSS server 112 and a AAA server 114 wherein the HSS server 112 is connected to the operator server through a Jh Link 115 and the AAA server 114 connected to the operator server through a Ja Link 125.

The Jh Link 115 forwards the credential information (such as list of call IDs with the IMSI information) to the Operator server 120 in the event there is a change in the subscription credential. Further, the Ja Link 125 forwards the account information of the secondary device 150 which is the record of differential service availed by the secondary device 150.

Figure 2:
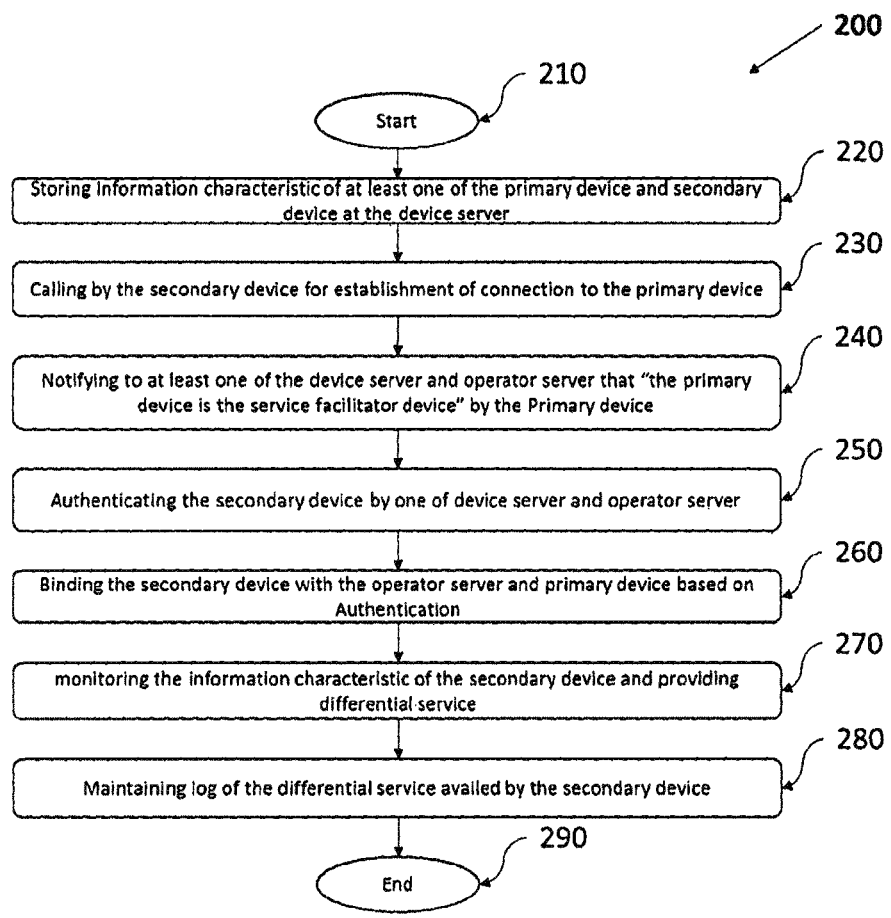
FIG. 2 illustrates a simplified flow diagram of the method for providing differential service scheme.

As illustrated in FIG. 2, the present invention discloses a method 200 for providing differential service scheme. The method initiates at step 210. At step 220, the information characteristic of at least one of the primary device and secondary device is stored in the device server. The information characteristic comprises credential information for unique identification of every user with secondary device and subscription information which contains details of the service the user with secondary device had subscribed.

At step 230, the secondary device calls to establish connection for availing differential service via the primary device. Wherein, the service is provided by the operator server and facilitated by/via the primary device.

At step 240, the primary device sends notification to at least one of the device server and operator server for updating at least one of the device servers and operator server. The notification sent by the primary device contains information that the primary device is the service facilitator device. The act of service facilitator device is a data pipe through which service can be provided upon authentication and confirmation. Upon identification of the service facilitator device, the operator server looks for secondary devices that are seeking connection for availing differential service.

At step 250, the secondary device is authenticated by at least one of device server and operator server. The authentication process includes various details exchange between the plurality of modules present in the device server and/or operator server. Further, the authentication is one of a single authentication and/or group authentication.

At step 260, the secondary device is bound to the primary device and operator server for providing differential service. Further, the binding involved in the present invention encompasses a binding method that enables the pairing of the information characteristic (for e.g. IMEI) of the secondary devices and with information characteristic (for e.g. IMSI) of the primary device together.

At step 270, the information characteristic of the authenticated secondary device is monitored by the operator server for providing differential service to the secondary device via the primary device. Further, the monitoring is meant for identifying the active user connected in the network and availing differential service. Furthermore, by monitoring the information characteristic of the secondary device aid identify and store the logs in an account manager by the operator server.

At step 280, a log is maintained at the account manager. The log basically maintains and maps the differential service availed by the secondary device against the information characteristic of the secondary device. Hence, the log aids the account manager to generate bill against the particular user of the secondary device for availing the differential service.

Further, it is to be noted that the description recited throughout the specification is an example of the disclosure and there can be modifications and changes to the examples which are within the scope and coverage of the disclosure provided. Furthermore, there may be additional functional elements which are essential for reduction to practice of the invention. However, for the purpose of disclosing best embodiment and reflecting the inventive feature of the invention, the disclosure is drafted to capture the invention in such a way. Hence, the scope and coverage of the appended specification should be accorded the broadest interpretation for encompassing all such variations in the modifications and similar arrangements, including a full scope and/or equivalent.

We claim:

1. A system for providing differential service scheme, the system comprises:
    a MiFi router for facilitating at least one service to at least one secondary device, wherein
        the service is provided based on information characteristic of the at least one secondary device;
        said information characteristic comprises a credential information and a subscription information of the at least one secondary device; and
        said information characteristic is one of a pre-configured information and a real-time information;

a device server for maintaining said credential information and subscription information;

an operator server for monitoring the credential information of the at least one secondary device and providing differential dissemination of the at least one service via the MiFi router; wherein at least one of the device server and the operator server authenticates the at least one secondary device based on a notification by the MiFi router; and the operator server binds the at least one secondary device based on said authentication for providing differential dissemination of the at least one service via the MiFi router; and an account manager for maintaining record of differential service being availed by the at least one secondary device based on said information characteristic of the at least one secondary device.

2. The system as claimed in claim 1, wherein the pre-configured information includes information characteristic of the at least one secondary device registered to avail the at least one service.

3. The system as claimed in claim 1, wherein the real-time information characteristic includes credentials gathered from instantaneous subscription and authentication.

4. The system as claimed in claim 1, wherein the notification by the MiFi router updates at least one of the device server and the operator server that the MiFi router is the service facilitator device.

5. The system as claimed in claim 1, wherein the subscription information includes description of a differential service type subscribed by the at least one secondary device.

6. The system as claimed in claim 5, wherein the differential service type is one of data, voice call, video call, and combination thereof.

7. The system as claimed in claim 5, wherein the differential service type is based on the subscription information of the at least one secondary device.

8. A method for providing differential service scheme, the method comprising steps of:

facilitating at least one service to at least one secondary device by a MiFi router; wherein the service is provided based on information characteristic of the at least one secondary device;

said information characteristic comprises a credential information and a subscription information of the at least one secondary device; and said information characteristic is one of a pre-configured information and real-time information;

maintaining said at least one of the credential information and subscription information by a device server;

monitoring the credential information of the at least one secondary device and providing differential dissemination of the at least one service via the MiFi router by an operator server, wherein at least one of the device server and the operator server authenticates the at least one secondary device based on a notification by the MiFi router; and the operator server binds the at least one secondary device based on said authentication for providing differential dissemination of the at least one service via the MiFi router; and maintaining record of differential service being availed by the at least one secondary device based on said information characteristic of the at least one the secondary device by an account manager.

9. The method as claimed in claim 8, further comprising step of maintaining the record of differential service availed by the at least one secondary device at one of the device server, the operator server, the MiFi router and combination thereof.

10. The method as claimed in claim 8, further comprising steps of:

sending the information characteristic of the at least one secondary device, from the device server to the operator server; and sending the record of differential service availed by the secondary device, from the account manager to the operator server.

* * * * *